Dec. 28, 1965    P. A. BYGDNES    3,226,579
ALTERNATING CURRENT ELECTRIC MOTOR
Filed Aug. 5, 1963
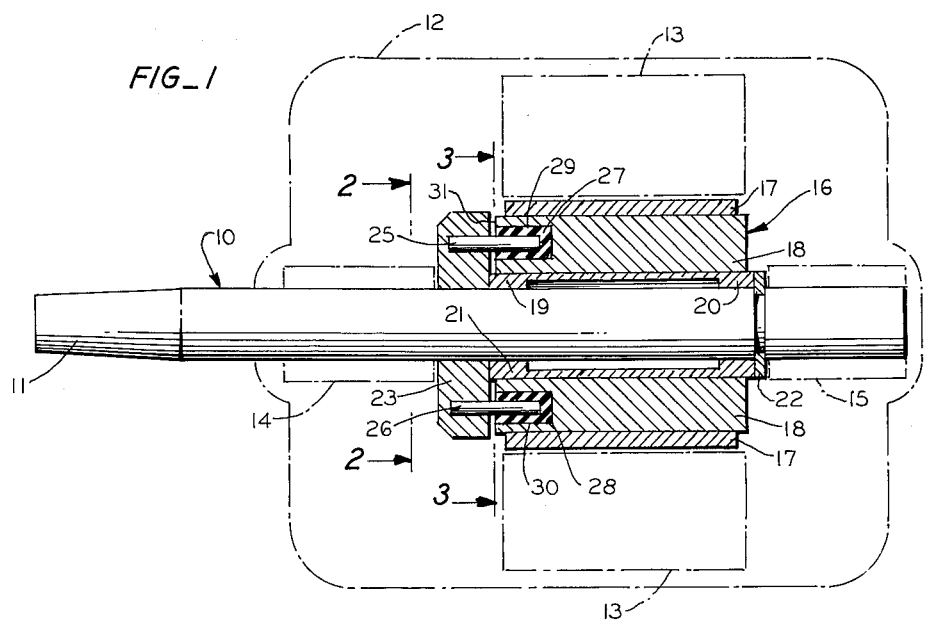
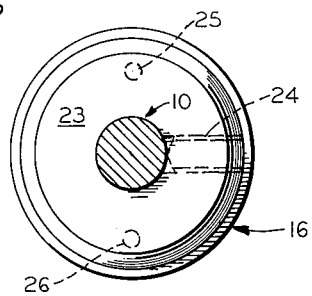
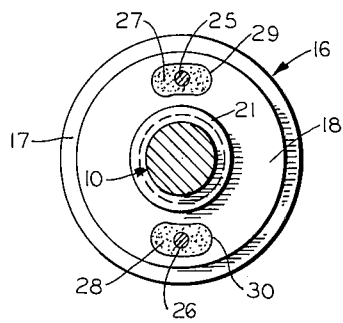
INVENTOR.
PERRY A. BYGDNES
BY
ATTORNEY

United States Patent Office 3,226,579
Patented Dec. 28, 1965

3,226,579
ALTERNATING CURRENT ELECTRIC MOTOR
Perry A. Bygdnes, Redwood City, Calif., assignor to Mach-Tronics, Inc., Mountain View, Calif., a corporation of California
Filed Aug. 5, 1963, Ser. No. 299,858
7 Claims. (Cl. 310—51)

The present invention relates to an alternating current electric motor, and in particular relates to an improvement therein wherein the electric motor rotates at a speed unaffected by magnetic field variations occurring during each cycle of rotation thereof.

Generally, A.C. electric motors have a stator and a rotor, wherein exciting windings or field coils in the stator create a rotating electromagnetic field which produces a torque on the rotor to cause rotation thereof. However, during each cycle of rotation of the electric motor, the effective rotating magnetic field of the stator does not rotate at a constant angular velocity, but varies slightly due to harmonic components and other irregularities. These irregularities are introduced by the incoming power source and are creased by the electromagnetic field-producing structure in the stator. Consequently, the rotor following these variations will slightly increase and correspondingly decrease in speed so the rotor can be said to "hunt" or vary about the primary rotational speed during each cycle of rotation. Various design means are used to minimize these irregularities.

For certain applications, such as in video tape recording and reproducing equipment, a synchronous motor may be used as a driver for moving a record or reproduce head or for moving magnetic tape at a constant predetermined speed. In this event, the frequency of the A.C. power source is equal to or proportional to the primary rotational speed of the electric motor. Although the synchronous motor rotates in exact synchronism with the rotating magnetic field produced by the stator windings, it does not rotate at a constant speed during its cycle of rotation but varies about its synchronous speed. In order to overcome the effect of these variations, elaborate servo systems are used to maintain the constant speed of the moving record/reproduce head or the tape.

The present invention comprises an A.C. electric motor which includes a rotational coupler connecting its rotor to its output shaft to rotate the output to correspond with the primary rotational speed of the rotating magnetic field and to absorb the variations thereof during each cycle of rotation. This present invention effectively eliminates the problems of these intra-cycle speed variations at its source, i.e. the motor itself, rather than utilizing subsequent correcting devices.

It is therefore an object of this invention to provide an A.C. electric motor having a simple and inexpensive improvement for controlling the effective speed of its output shaft to maintain it at a constant angular velocity.

Another object of this invention is to provide an A.C. electric motor that prevents intra-cycle variations at its source, rather than utilizing subsequent speed correcting devices.

Still another object of this invention is to provide an A.C. electric motor having an output shaft isolated from the variations in speed of its rotor during each cycle of rotation.

A further object of this invention is to provide an A.C. electric motor having a rotor following a rotating electromagnetic field produced therein, but having an output shaft rotating at an effectively constant average speed of the rotor.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 1 is a cross sectional view of an alternating current electric motor of this invention and showing an hysteresis type synchronous motor suitable for use as a driver in video tape recording apparatus.

FIG. 2 is a side view of the collar attached to the shaft as seen along lines 2—2 of FIG. 1.

FIG. 3 is a view of the rotor of the motor as seen along lines 3—3 of FIG. 1.

Referring now to the figures, there is shown in FIG. 1 a cross sectional view of an alternating current electric motor of this invention. An output shaft 10 has an end 11 extending from housing 12 for connection to a desired load for the motor. Within housing 12 and secured thereto is a stator 13 which includes exciting windings wound around pole pieces as in conventional motors to create a rotating electromagnetic field. For example, a single phase synchronous motor may have two sets of windings in its stator wherein 60 cycle A.C. power current is applied directly to one set of windings, and is applied through a capacitor to the other set of windings to create an effective rotating magnetic field. Such stators are well known in the prior art and are described for example in chapter 10 of the textbook entitled "Electric Machines, Direct and Alternating Current" by Charles S. Siskind, published by McGraw-Hill Book Company, Inc., in 1950.

Output shaft 10 is rotatively supported by spaced bearings 14 and 15 at opposite ends of shaft 10 within housing 12. A rotor generally designated as 16 has a single solid ring 17 of hysteresis magnetic material surrounding and secured to a non-magnetic arbor 18 made of aluminum or the like which rests on the supporting ends 19 and 20 of sleeve-like bearing 21. Rotor 16 is therefore capable of rotating around output shaft 10 without directly transmitting its movement to shaft 10 through said bearing 21.

As seen in FIG. 1, in order to hold rotor 16 in the position shown, a retainer ring 22 is secured to shaft 10 on the right side of rotor 16, and a rotational coupler is provided on the left side of rotor 16. The rotational coupler is provided to connect rotor 16 to output shaft 10 in order to rotate said output shaft at a constant speed corresponding to the rotational speed of rotor 16, and to absorb the speed variations of the rotor occurring during each cycle of rotation. This rotational coupler includes a flange collar 23 secured to output shaft 10 by setting screw 24 (seen in FIG. 2), a connecting member which is seen to be a pair of extending pins 25 and 26, and a resilient isolating member which is seen to be a pair of rubber pads 27 and 28 cemented within cutouts 29 and 30 respectively in side 31 of arbor 17 (seen in FIGS. 1 and 3). Flange collar 23 and extending pins 25 and 26 are the connecting means for engaging said resilient isolating member shown to be rubber pads 27 and 28. It will be realized that one or more rubber pads may be used, as well as one or more extending pins for developing the resilient connection between the rotor and the output shaft. Pins 25 and 26 on flange collar 23 extend into and engage rubber pads 27 and 28 respectively in order to transmit the rotation of rotor 16 to output shaft 10 and to absorb and therefore isolate the intra-cycle variations thereof.

In operation, when 60 cycle alternating current power is applied to the exciting windings of stator 13, an effective rotating electromagnetic field is produced which extends into ring 17 made of hysteresis magnetic material. The hysteresis property of magnetic material in ring 17 will oppose any changes in magnetic polarities established therein, and the rotor will then "lock in step" with the rotating electromagnetic field produced in stator 13. Accordingly, rotor 16 will then rotate in synchronism with said rotating field. In the electric motor shown in the figures, with 60 cycle A.C. power input and two sets of windings in the stator, the electric motor will rotate at 60 cycles per second or 3600 r.p.m. For this situation, such speed of 3600 r.p.m. is the desired primary rotational speed of the motor; the speed of the rotor will correspond to said primary rotational speed of the motor in being equal thereto.

As exciting windings of a motor cannot produce a perfect sinusoidally varying electromagnetic field, certain cyclic repetitive variations thereof necessarily will occur during each cycle. Careful design of electric motors will smooth out such variations, but will not eliminate them. It will be appreciated that these variations, which occur during each cycle of rotation, do not change the synchronous speed of the motor. During each cycle of rotation, these variations in rotor speed occur and cancel each other out, so that the over-all synchronous speed of the motor is maintained. For certain purposes, such as in video record and reproduce tape recorders, it is desirable to further effectively eliminate these intra-cycle variations and to have motor rotating at a constant average speed equal, of course, to the synchronous speed.

Accordingly, in the described embodiment of the present invention, the rotor is rotatively supported on output shaft 10 to rotate at 3600 r.p.m. But instead of directly driving output shaft 10, rotor 16 includes rubber pads which engage pins 25 and 26 extending from flange collar 23 to drive said output shaft 10. Output shaft 10 will then rotate in synchronism with the overall speed of rotor 16. The energy of the variations from synchronous speed will be absorbed and isolated by the resilient isolating member including rubber pads 27 and 28. It is to be noted that the resilient isolating member does not temporarily store the energy of these variations to subsequently return the energy, as an ordinary spring would do, since accentuation of the increases and decreases of these cyclic variations would then occur. Instead, the rotational coupler is capable of transmitting the rotational speed of the rotor to the output shaft, and is capable of absorbing and thereby isolating the variations of the rotational speed during each cycle, so that the output shaft 10 rotates at a constant average speed corresponding to the synchronous speed of the electric motor.

Although the above described embodiment refers to a single phase A.C. synchronous motor, which is a preferred embodiment, it is obvious that various other alterations and changes may be made in form and arrangement of the details of the described improvement in electric motors without departing from the scope of the appended claims.

Having herein described the invention, what is claimed as new is:

1. An alternating current electric motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exciting windings of the stator; and a rotational coupler connected to the rotor and to the output shaft to rotate the output shaft at a speed corresponding to the rotational speed of said rotor and to absorb the variations thereof during each cycle of rotation.

2. An alternating current electric motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exiting windings of the stator; and a rotational coupler including a resilient isolating member secured to said rotor and being capable of absorbing the variation components of the speed of the rotor, and connecting means to engage the resilient isolating member and connected to the shaft to transmit the rotational speed of the rotor to the output shaft, said rotational coupler being capable of absorbing the variations of the rotor during each cycle of rotation thereof.

3. An alternating current electric motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exciting winings of the stator; and a rotational coupler including a resilient isolating member secured to said rotor and being capable of absorbing the variation components of the speed of the rotor, a flange collar secured to rotate with the shaft, and a connecting member secured to the flange collar and extending therefrom to engage the resilient isolating member, said rotational coupler transmitting the rotational speed of the rotor to the output shaft and absorbing the variations of said rotational speed during each cycle of rotation.

4. An alternating current electric motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exciting windings of the stator; and a rotational coupler including one or more rubber pads secured to a portion of the rotor and being capable of isolating the variation components of the speed of the rotor from the output shaft, a flange collar secured to the shaft to rotate therewith, and a connecting member secured to the flange collar and extending therefrom to engage said rubber pads, said rotational coupler transmitting the rotational speed of the rotor to the output shaft and isolating the variations of said rotational speed of the rotor during each cycle of rotation.

5. An alternating current electric motor comprising: a a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exciting windings of the stator; and a rotational coupler including a plurality of rubber pads secured to the rotor and being capable of isolating the variation components of the speed thereof from the output shaft, a flange collar secured to the output shaft to rotate therewith, and a connecting member secured to the flange collar to engage said plurality of rubber pads, said rotational coupler transmitting the rotational speed of the rotor to the output shaft and isolating the variations of said rotational speed of the rotor during each cycle of rotation.

6. A synchronous motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor being rotatively supported on the output shaft to be rotated by the rotating electromagnetic field produced by the exciting windings of the stator, said rotor including a non-magnetic arbor, and an hysteresis ring of magnetic material supported on said non-magnetic arbor; and a rotational coupler including a plurality of rubber pads secured to the arbor of said rotor and being capable of absorbing the variation components of the speed thereof from the output shaft, a flange collar secured to the output shaft to rotate therewith, and a connecting member secured to the flange collar to engage said plurality of rubber pads, said rotational coupler transmitting the rotational speed of the rotor to the output shaft and absorbing the variations of said rotational speed of the rotor during each cycle of rotation.

7. A synchronous motor comprising: a stator having exciting windings to produce a rotating electromagnetic field at a desired rotational speed and having speed variation components thereof during each cycle of rotation; an output shaft extending centrally within said stator; a rotor surrounding said output shaft and being capable of rotative movement relative therewith, said rotor including a non-magnetic arbor, and a hysteresis ring of magnetic material supported on said non-magnetic arbor; and a rotational coupler connected to the arbor of said rotor and to the output shaft to rotate the output shaft at a speed corresponding to the rotational speed of said rotor and to absorb the variations thereof during each cycle of rotation.

References Cited by the Examiner

UNITED STATES PATENTS

| | | | |
|---|---|---|---|
| 1,793,347 | 2/1931 | Weir et al. | 64—10 |
| 1,904,745 | 4/1933 | Nowosielski | 310—75.4 |
| 2,385,369 | 9/1945 | Niekamp | 64—11 |
| 2,735,030 | 2/1956 | Brainard | 310—261 |

ORIS L. RADER, *Primary Examiner.*

MILTON O. HIRSHFIELD, *Examiner.*